UNITED STATES PATENT OFFICE.

THOMAS DE DIENHEIM BROCHOCKI, OF BOULOGNE, FRANCE.

IMPROVEMENT IN BLEACHING COMPOUNDS.

Specification forming part of Letters Patent No. 212,890, dated March 4, 1879; application filed May 28, 1877; patented in France, November 15, 1876.

To all whom it may concern:

Be it known that I, M. Le Comte THOMAS DE DIENHEIM BROCHOCKI, of Boulogne-sur-Seine, France, have invented an Improvement in the Manufacture of Solidified Hypochlorite of Sodium, (to be used as a substitute for lye of Javelle,) of which the following is a specification:

Alkaline hypochlorites in a liquid condition, which have received various names, such as "Lye of Javelle," or "Lebarraque Liquor," are considered perfect as bleaching materials.

This invention relates to the preparation of these substances in a solid condition, either crystallized, or granular, or in cake, in the following manner: A concentrated alkaline lye of soda or potassa is cooled, and through it is passed a current of chlorine gas previously cooled and washed in cold water until the lye becomes almost completely saturated, being kept cool throughout the operation by the immersion of the vessels employed in a bath of water which is kept at a low temperature, not exceeding 50° Fahrenheit. At the end of about twenty-four hours there is obtained a crystallized product possessing powerful bleaching properties. The mother-liquor concentrated by evaporation *in vacuo* being again cooled will furnish an additional quantity of the crystals.

Another method is to pass a current of chlorine over a thin layer of alkaline carbonate spread over surfaces kept cold in a close vessel. The chlorine issuing from this vessel is passed through a very strong lye of oxide of the same alkali as that in the carbonate, and this lye kept constantly cool readily absorbs the chlorine, producing hypochlorite. By a lateral opening that can be hermetically closed, fresh quantities of carbonate are introduced into the first vessel from time to time, when the material therein is supposed to be nearly saturated, and thus the risk of decomposition is avoided. The liquid hypochlorite produced in the second vessel being mixed with partially-saturated carbonate in the first, there is obtained a new product, which is solid and crystalline, the carbonate taking up the water of the hypochlorite solution, so as to fix the hypochloric acid in a solid form, and in quantity depending on the proportions in which the liquid hypochlorite and the partially-saturated carbonate are mixed together.

For the purpose of solidifying the hypochlorite solution the carbonate may be used without being in the first place exposed to chlorine, and may be employed for the same purpose; but in such case the product is less strong in chlorine.

The solidified product obtained by either of the methods above described is white in color, but may be colored as desired. It retains its bleaching properties longer than any of the liquid hypochlorites; it may be prepared for commerce in the condition of a granular salt by merely agitating the solution when it becomes pasty, or in cakes by running the pasty mass into molds and allowing it to solidify at low temperature, the molds being for that purpose iced. It can be easily packed and transported, as in the solid condition it does not affect metals nor organic substances. For use it is dissolved in cold water with facility.

Having thus described the nature of my invention, and in what manner the same is to be performed, I claim—

As an improvement in compounds used for bleaching purposes, as eau de Javelle, a solid compound produced by saturating a solution of protoxide of sodium with chlorine gas, and adding to the hypochlorite thus produced twenty to forty per cent. of desiccated carbonate of soda, substantially as described.

In witness whereof I, the said Comte THOMAS DE DIENHEIM BROCHOCKI, have hereunto set my hand this 17th day of April, A. D. 1877.

CT. THOMAS DE DIENHEIM BROCHOCKI.

Witnesses:
    ARMENGAUD, Jeune,
    ROBT. M. HOOPER.